UNITED STATES PATENT OFFICE.

GUSTAV SPIESS, OF FRANKFORT-ON-THE-MAIN, AND ADOLF FELDT, OF OBERURSEL, GERMANY, ASSIGNORS TO FARBWERKE VORM. MEISTER LUCIUS & BRUNING, OF HÖCHST-ON-THE-MAIN, GERMANY, A CORPORATION OF GERMANY.

AURIC COMPOUNDS FROM CANTHARIDYLETHYLENEDIAMIN AND PROCESS OF MAKING SAME.

1,104,149. Specification of Letters Patent. Patented July 21, 1914.

No Drawing. Application filed July 28, 1913. Serial No. 781,642.

*To all whom it may concern:*

Be it known that we, GUSTAV SPIESS, M. D., professor of medicine, and ADOLF FELDT, Ph. D., chemist, citizens of the Empires of Germany and Russia, respectively, residing at Frankfort-on-the-Main, Germany, and Oberursel a. T., Germany, respectively, have invented certain new and useful Improvements in Auric Compounds from Cantharidylethylenediamin and Processes of Making Same, of which the following is a specification.

It is known that cantharidin possesses a particular affinity to tuberculous foci. However as the cantharidin constitutes an exceedingly strong poison when introduced into the human body while it has apparently no strong bactericidal action, it could hitherto not be used as a therapeutic.

Now we have found that, when using the cantharidin as starting material, highly efficacious products suitable for being used as a remedy for tuberculosis are obtained by first rendering the cantharidin less poisonous by condensation with ethylenediamin and then causing a complex auric acid, particularly auric chlorid, auric cyanid, or auric rhodamid to act upon the product thus obtained. The products thus obtained correspond most probably to the general formula:

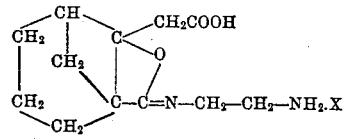

wherein X stands for a complex auric acid. They are colorless to golden-yellow crystals, which are soluble in water without decomposition, scarcely soluble in ether and benzene and decompose when heated, leaving metallic gold. The products have a very strong bactericidal action when introduced into the animal or human body.

The following examples illustrate our invention:

Example I: 1 gram of the hydrochlorid of the said cantharidin base $O_{12}H_{18}O_3N_2$ is dissolved in 10 cc. of cold water and there is added drop by drop a concentrated solution of auric chlorid until the precipitation ceases. The aurate at once separates in the form of golden-yellow crystalline laminæ which melt at 218–220° C.

Example II: 1 gram of the hydrochlorid of the cantharidin base above referred to is dissolved in 5 cc. of cold water and there is then added a solution of 1.12 grams of potassium aurocyanid in 15 cc. of cold water. After a short time, the auric cyanate separates in the form of large, colorless crystals, melting at 226–227° C. The analysis of the substance showed a percentage of gold of 36.28, whereas according to theory it should be 36.48.

Example III: To 1 gram of the hydrochlorid of cantharidylethylenediamin, dissolved in 25 cc. of water, is added a solution of 1 gram of pure potassium-aurorhodamid in 25 cc. of water. The salt which separates is immediately filtered off as decomposition sets in if it stands for a longer time. The said salt is moderately soluble in cold water. It crystallizes in the form of colorless laminæ melting at 168–170° C. By analysis it is found to contain 36.2 per cent. of gold, whereas according to theory the percentage should be 35.69.

Example IV: 25 grams of cantharidylethylenediamin hydrochlorid are dissolved in 100 cc. of water and there is then added a solution of 25 grams of potassium aurocyanid in 200 cc. of water. After a short time the aurate separates in the form of beautiful colorless crystals. The cantharidylethylenediamin aurocyanid thus obtained melts at about 177–179° C. It is readily soluble in water, scarcely soluble in ether and benzene. It probably contains the atomic group

It decomposes when heated, leaving metallic gold.

Having now described our invention, what we claim is:

1. The process of preparing derivatives from cantharidylethylenediamin, which consists in causing a complex auric acid to act upon the cantharidin ethylenediamin.

2. As new products, auric compounds from cantharidylethylenediamin which most probably correspond to the genral formula:

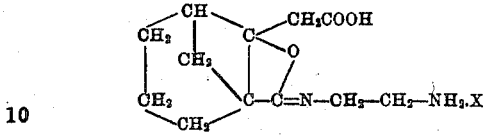

wherein X stands for a complex auric acid, being colorless to golden-yellow crystals, soluble in water without decomposition, scarcely soluble in ether and benzene and decomposing when heated, leaving metallic gold.

3. As a new product, the cantharidyl-ethylenediamin aurocyanid, having most probably the atomic group:

$$=N-CH_2-CH_2-NH_2.H-Au(CN)_2,$$

being colorless crystals, soluble in water without decomposition, scarcely soluble in ether and benzene and decomposing when heated, leaving metallic gold.

In testimony whereof, we affix our signatures in presence of two witnesses.

GUSTAV SPIESS.
ADOLF FELDT.

Witnesses:
  JEAN GRUND,
  CARL GRUND.